United States Patent [19]

Miller

[11] 4,140,193

[45] Feb. 20, 1979

[54] AUTOMATIC STEERING FOR CONSTRUCTION MACHINES

[76] Inventor: Charles P. Miller, 1617 N. Draper Rd., McHenry, Ill. 60050

[21] Appl. No.: 790,394

[22] Filed: Apr. 25, 1977

[51] Int. Cl.² ............................................. B62D 11/20
[52] U.S. Cl. .............................. 180/9.46; 37/DIG. 20; 172/3; 404/84
[58] Field of Search ................ 180/9.46, 140; 404/84; 172/5, 6, 3; 37/108 R, DIG. 20

[56] References Cited

U.S. PATENT DOCUMENTS

| 3,792,745 | 2/1974 | Files | 180/140 X |
| 4,029,165 | 6/1977 | Miller et al. | 180/9.46 |
| 4,041,623 | 8/1977 | Miller et al. | 404/84 |

*Primary Examiner*—John A. Pekar
*Attorney, Agent, or Firm*—Bruce K. Thomas

[57] ABSTRACT

Automatic control means for the coordinated steering of front and rear pairs of individually steerable ground engagement means supporting a construction machine are disclosed wherein signals from front and rear steering sensors following a grade reference extending along the path of travel are fed to a panel readout/amplifier unit which sends error signals to a servo-valve system and feedback signals from potentiometers are produced to coordinate the degree of steer and the magnitude thereof with that of the sensed signals. In one embodiment the control means coordinate the parallel steering of the pairs of ground engagement means of a machine in the paving mode through the use of individual steering rams for each of the ground engagement means without the necessity of using steering linkages.

10 Claims, 9 Drawing Figures

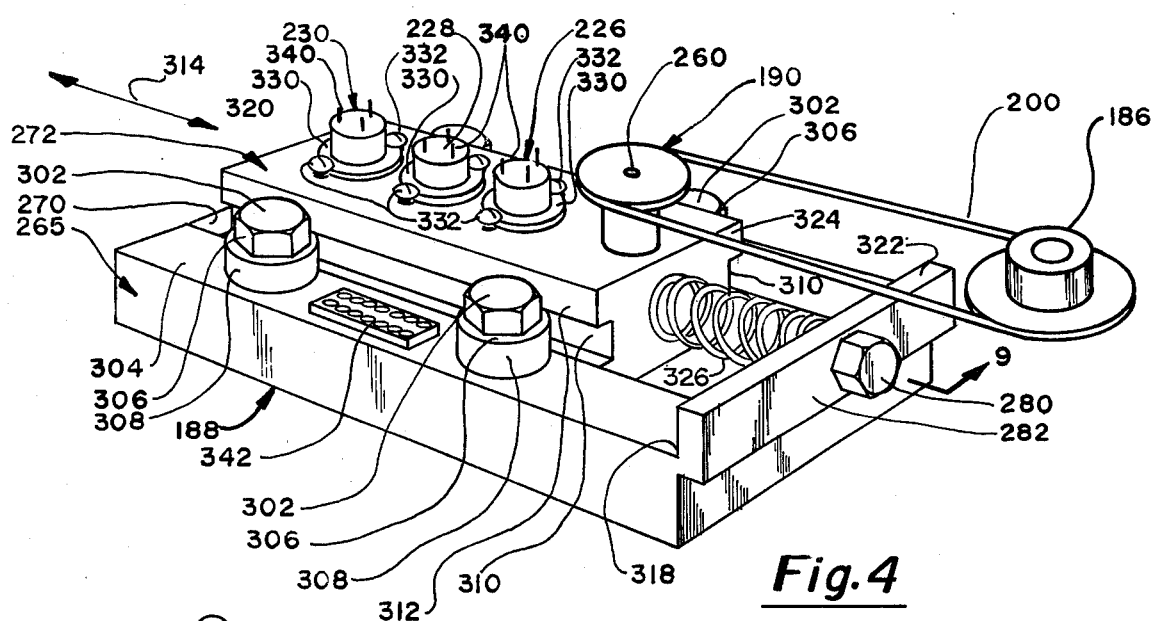
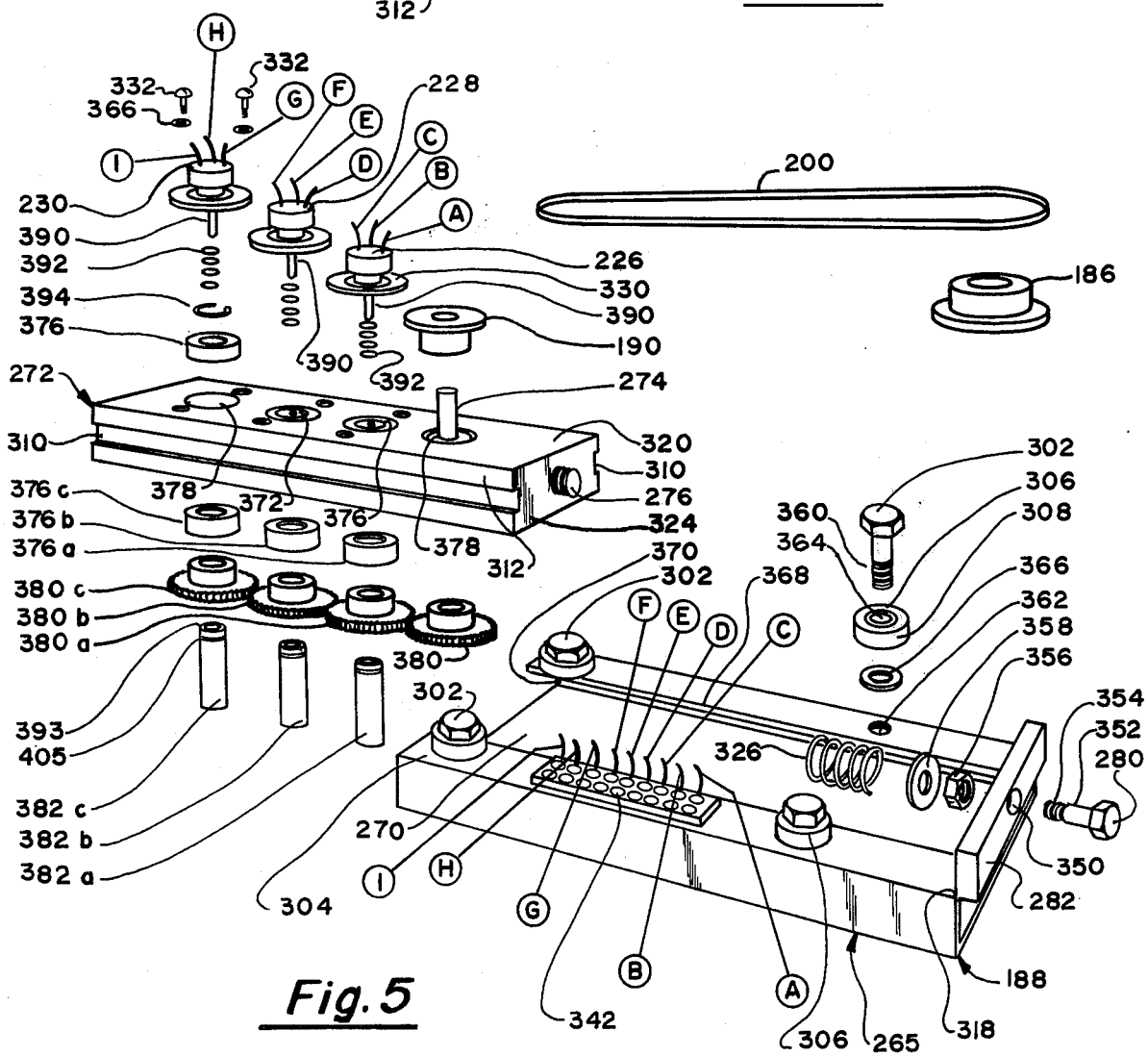

AUTOMATIC STEERING FOR CONSTRUCTION MACHINES

RELATED APPLICATIONS

This application is related to application Ser. No. 655,389, entitled Convertible Construction Machine, filed Feb. 5, 1976 by Charles P. Miller and David J. Miller now U.S. Pat. No. 4,029,165.

BACKGROUND OF THE INVENTION

According to the above-identified patent a construction machine is disclosed having a main frame supported by means of three or four vertically adjustable suspension points from a pair of walking beams located on opposite sides of the main frame. A vertical steering axis is provided at the ends of each walking beam connected to a bogey-mounted self-propelled ground engagement means in the form of a wheel or endless track.

One of the walking beams called the modified beam is connected to its side of the main frame by two spaced adjustable suspension means that are attached to the beam by pivotal bogey-mounts. One of the adjustable suspension means is attached to the frame rigidly in a vertical position while the other is pivotally mounted to the frame on a horizontal axis. The other walking beam is standard and is connected to the opposite side of the main frame on a single central vertically adjustable suspension means through a central pivot on a bogey-mount. The combination forms a three-point suspension for the frame on the walking beams. The four ground engagement means are attached to the ends of the walking beams in steerable pairs, in unison or individually so that it is possible to run the machine in any direction in relation to the plane of the main frame.

This basic construction also includes the use of two such modified walking beams having adjustable suspension means at each of their ends, both of which are horizontally pivoted to the frame on opposite or diagonal corners of the frame to form a four-point suspension. These embodiments whether three-point or four-point suspension, support the main frame well above the ground engagement means so both side-mounted and straddle-mounted tools can be used. The steering of each ground engagement means about its vertical steering axis at the end of its respective walking beam is accomplished by means of steering rams that connect from the saddle or bogey-mount to a spaced position along the walking beam. Extension or retraction of the ram rotates the bogey-mount and tractor on its vertical steering axis. Sequential attachment of one end of a ram to circumferentially spaced ears or lugs on the bogey-mount allows one ram to be used in turning a tractor 90° or more. This result can be accomplished using motor-drive and a ring and pinion gear arrangement for full 360° turning of a tractor. The actuation of the steering rams in pairs is coordinated by a servo-valve controlled hydraulic system or through a belt driven homing type sensor and feedback unit connecting two of the tractors and thereby sending a corresponding signal from one tractor for response by the opposite tractor through their respective steering rams or steering motors.

SUMMARY OF THE INVENTION

The instant invention is directed to certain improvements in the use of homing type sensors and feedback system to further coordinate and more finitely control the steering of opposite pairs of tractors whereby mechanical backlash or play is eliminated. Mechanically this is accomplished by a chain and gear drive for front and rear feedback and slave potentiometers at the sensor side of the machine which are thus coordinated and controlled. The slave feedback potentiometers produce a control signal for the opposite side of the machine so that rotation of one tractor closely follows or coincides with the rotation of the other.

In one embodiment, as a front tractor, for example, turns by means of its ram in response to a steering signal from its sensor through its servo-valve control, the tractor also rotates a feedback potentiometer producing a nullifying signal which stops the steering response irrespective of the steering signal unless overridden in magnitude thereby. The steering sensor and the feedback potentiometer work together to control the steering ram for the one front tractor. At the same time a slave sensor potentiometer is rotated in synchronism sending a signal through an amplifier-servo valve system causing the other front tractor to rotate, and also in synchronism, this tractor rotates a feedback potentiometer which sends a signal back to the amplifier searching for the null point, slaving the second tractor to the first. Similar control is used for the rear pair of tractors on opposite sides of the machine in the paving mode of operation. Other embodiments will be disclosed.

DESCRIPTION OF THE DRAWINGS

Illustrative embodiments of the invention are shown in the drawings wherein:

FIG. 4 is a perspective view of a constant tension chain drive control and potentiometer assembly for the front master feedback and slave sensor control;

FIG. 5 is an exploded perspective view of the assembly of FIG. 4 to illustrate the essential parts;

DESCRIPTION OF ILLUSTRATIVE EMBODIMENTS OF THE INVENTION

Figure 1:
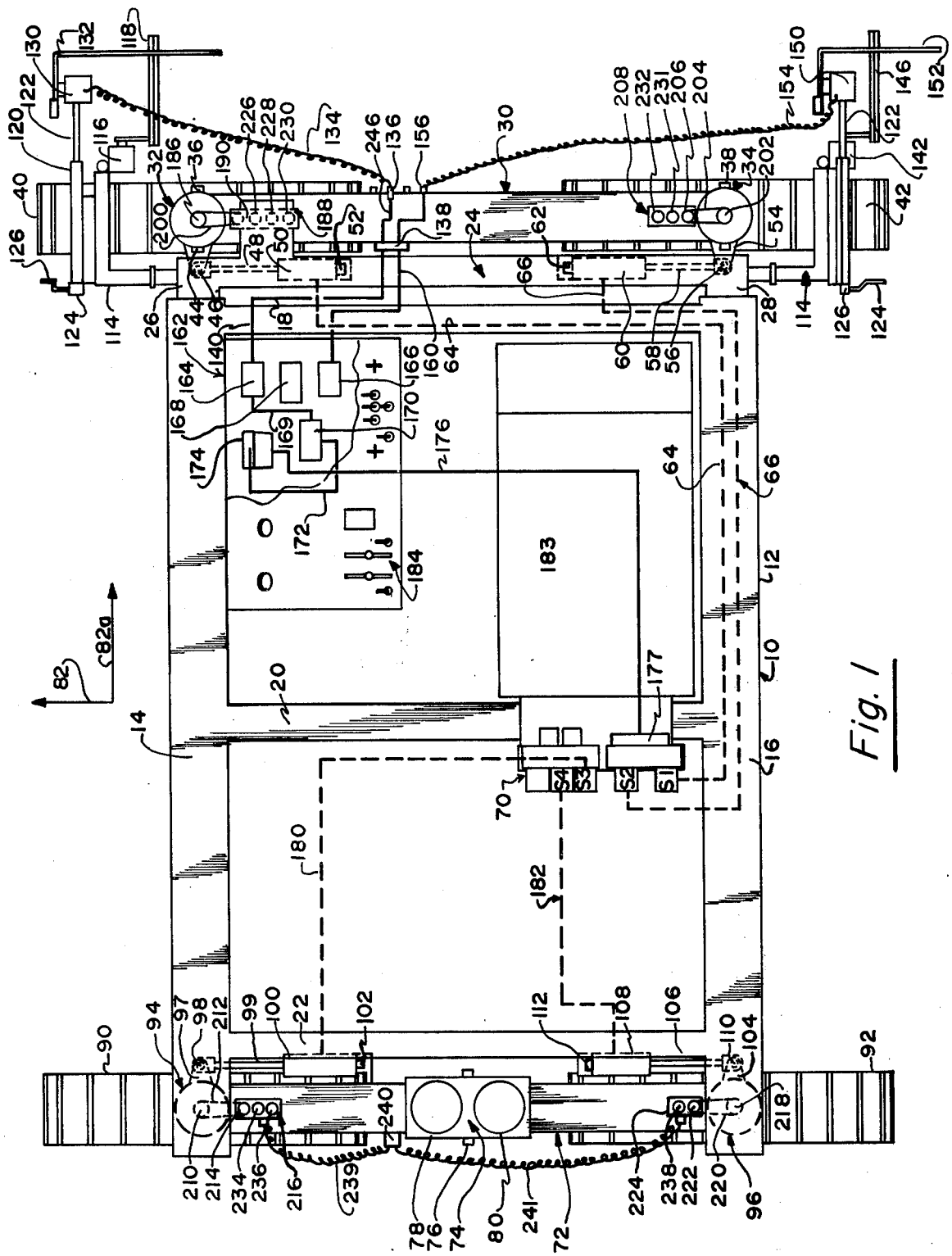
FIG. 1 is a schematic plan view of a concrete paving machine, similar to that disclosed in said copending application to illustrate the essential electrical and hydraulic controls to coordinate the steering of the front and rear pairs of tractors in unison as a steering signal is sensed along the path of travel.

Referring to FIG. 1, a simplified plan view of one form of the invention is shown. The machine 10, representative of a four-tractor machine, includes a frame 12 having a front square tubular cross-member 14, a rear square tubular cross-member 16 tied together by the longitudinal brace members 18, 20 and 22. The span of the frame members 14 and 16 may be of any dimension and preferably is about the width of a single lane of pavement. The frame includes a U-shaped frame member 24, the bifurcated legs 26 and 28 of which are received within the transverse tubular frame members 14 and 16 in telescoping relationship. The machine 10 can be extended in width to accommodate various lengths of tools. The frame 12 is shown in FIG. 1 with the U-shaped member 24 in its closed or narrowest position. The modified walking beam 30 extends along the steering or inboard side of the frame 12 and is spaced outwardly from the U-shaped frame member 24.

The U-shaped frame member 24 carries a front vertically adjustable support means and a rear vertically adjustable support means each of which would attach to the front and rear steering axis mounts 32 and 34. This means of attachment includes additional bogey-mounts at the ends of these supports that would be pivotally attached to the dual pin mounts 36 and 38 that are carried by fixed housings of the steering axes 32 and 34. These parts have been omitted for simplicity. One or the other of the vertically adjustable supports for the frame 12 may be attached to the U-shaped frame member 24 by means of a horizontal pivot as is disclosed in said co-pending application.

The right front tractor 40 is carried by its individual bogey-mount 250 (See FIG. 2 also) from the vertical steering axis 32 at the front end of the modified walking beam 30. The rear tractor 42 on the same side of the machine is similarly carried by a bogey-mount 251 (See FIG. 2 also) under and pivotally rotated from the vertical steering axis 34. The front bogey-mount for the tractor 40 has an inwardly directed arm 44 which is attached by the end pivot or clevis mount 46 to the operating rod 48 of the main front steering ram 50. The housing of the front steering ram 50 is pivotally connected at the pivot or clevis mount 52 to the walking beam on its inner side. The extension or retraction of the ram 50 and its steering rod 48 moves the arm 44 about the steering axis 32 and turns the tractor 40 as a steering function.

Similarly the rear steering axis and bogey-mount 34 for the tractor 42 includes the inwardly directed steering arm 54 to which is attached, by means of the pivot 56, the operating rod 58 of the second steering ram 60. The housing of the steering ram 60 is attached to the inside of the walking beam 30 by means of the pivot 62. The extension or retraction of the operating rod 58 of the ram 60 rotates the tractor 42 about the steering axis 34.

Both of the rams 50 and 60 are dual operating and would include an intake and outlet on each side of the piston therein. The admission of hydraulic oil under pressure into an inlet moves the piston in the direction of the outlet and the system would allow the hydraulic oil to leave the housing at the outlet in a known manner.

In order to avoid the necessity of showing both inlet and outlet hydraulic lines to control the rams 50 and 60, the diagram illustrates these controls by means of the broken line 64 for the control of the ram 50 and the broken line 66 for the control of the ram 60. The line 64 from the ram 50 leads to the servo-manifold 70 wherein hydraulic fluid under pressure is controlled and diverted to and from this hydraulic system 64 by means of the two-way servo-valve S-1. Similarly the two-way hydraulic line 66 leads to the servo-manifold 70 wherein the bi-directional flow of hydraulic fluid is controlled by the servo-valve S-2.

Thus, the actuation of the servo-valve S-1 causes the ram 50 to extend or retract. The operation of the servo-valve S-2 causes the ram 60 to extend or retract. As will be described, the ram 50 and the ram 60 are extended and retracted independent of each other.

On the inboard side of the frame 12 the machine 10 has the walking beam 72 which extends under the extended ends of the frame members 14 and 16 on this side of the machine and in parallel relationship with the frame member 22. Central of this side of the frame there is included a single vertically adjustable frame support means 74 which is pivotally mounted to the center of the walking beam 72 by means of the transverse pivot axis 76. This side of the frame carries the vertically adjustable support means 74 in a rigid vertical relationship.

In order to maintain the walking beam 72 at all times in parallel relationship with the side 22 of the frame 12, the vertically adjustable support means 74 has a pair of reciprocating cylinders 78 and 80 which act as guide sleeves for vertically oriented rams (not shown) mounted on the inside of the sleeves. These rams operate in unison to extend and retract and control the slope of the machine. At the same time, the front and rear vertically adjustable support means on the other side of the machine, through their vertically encased rams, control the grade of the frame 12 as the machine traverses a path of travel which may be indicated by the arrow 82. The machine as shown in FIG. 1 is in the pave mode and would carry suitable augers, screed, vibrators and oscillating screed to lay a lane of pavement as it progresses.

It is to be observed that a single ram and single guide sleeve assembly may be connected between the frame and the walking beam 72 provided some means is included to prevent the sleeve from rotating on a vertical axis. This can be accomplished by making the sleeve arrangement square or by splining the reciprocating parts. However, this is an expensive approach and the use of the double ram and double sleeve arrangement shown in FIG. 1 has proved to be very efficient and durable. It is to be understood that the arrangement of tractors and the steering control that will be described in this specification need not include the walking beams 30 and 72. A four-corner, four-tractor support system may also be employed in carrying out this invention. The use of the three-point system just described to include the front and rear adjustable supports operating on the steering axes 32 and 34 of the walking beam 30 and the single support 74 operating on the central pivot 76 of the walking beam 72 increases the accuracy of the slope and grade control as described in said co-pending application and other applications and existing patents by the instant inventors. Furthermore, the control system of the invention may be applied to any selected pair of ground engagement means to attain a slaved-steering function regardless of what type of wheel forms the third or fourth support.

The front tractor 90 and the rear tractor 92 on the inboard side of the frame 12 are connected to the walking beam 72 by means of their individual vertical steering axes 94 and 96, in the same manner as the tractors 40 and 42 are suspended from their respective steering axes 32 and 34 on the outboard side of the machine. The details of these mountings for the four tractors will be further described in relation to FIG. 3.

The front steering mount 94 includes an inwardly directed steering arm 97 to which is attached, by means of the clevis pin 98, the operating rod 99 of the inboard front steering ram 100. The housing of the steering ram 100 is attached to the inside of the walking beam 72 by means of the pivot or clevis 102.

The rear steering axis 96 for the tractor 92 includes a corresponding steering arm 104 to which the operating rod 106 of the rear steering ram 108 is attached at pivot 110. Again the housing of the steering ram 108 is attached to the walking beam 72 at the pivot 112. It is apparent that the tractors 90 and 92 along with the walking beam 72 can negotiate undulations in the grade by raising and lowering the respective ends of the walking beam about the central pivot 76 and at the same time each of the tractors can pivot about its bogey-mount.

The U-shaped frame member 24 has the front bracket assembly 114 to which is attached the grade sensor 116 having its sensor arm 118 biased slightly against the underside of a grade reference or grade line (not shown) extending along the intended path of travel of the machine. The assembly 114 includes a tubular support 120 having a longitudinal support arm 122 under the control of the gear box 124 and operating handle 126. Turning the handle 126 in different directions causes the longitudinal support arm 122 to extend and retract. The front steering sensor 130 is affixed to the extended end of the arm 122 and has its pendant sensing arm 132 in sliding contact with the grade line. The grade line is not illustrated for purposes of simplicity and would be supported in taut relationship from a series of spaced uprights driven into the grade. The electrical lead from the steering sensor 130 is illustrated by the flexible cable 134 leading back to one of a series of plugs 136 on the outside of the walking beam 30 and thence to the junction box 138 where it connects with the protecting flexible conduit 140.

At the rear end of the walking beam 30 a similar suspension assembly 114 is attached to the U-shaped frame member 24 supporting the grade sensor 142 at this side of the frame with the sensing arm 146 in biased contact with the underside of the stringline. A second crank handle 124 with gear box 126 and extensible arm 122 serves to adjustably support the rear steering sensor 150 with its pendant sensing arm 152 in sliding contact with the stringline. The flexible control cable for the steering sensor 150 is illustrated at 154 connected to the plug 156 and thence to the junction box 138 provided on the inside of the walking beam 30.

The electrical conduits 140 and 160 are attached to protected portions of the frame and lead to the amplifier group 162 and connect, respectively, to the individual amplifiers 164 and 166. The steering sensors and the grade sensors and other components are electrically-operated from current supplied by a generator, through the power plant and from batteries. One function of the amplifier group 162 is to transform the current to the proper type (AC or DC) for these functions. The details of the amplifier group 162 need not be described since this device employs known components. For purposes of this invention it suffices to point out that the amplifier group 162 includes the first master steering amplifier 164 receiving its signal from the steering sensor 130 through the electrical leads 134 and 140. The rear master amplifier 166 receives its signal from the steering sensor 150 through the leads 154 and 160. The amplifier group 162 includes a front and rear dual slave amplifier 168, the functions of which are to be described.

FIG. 1 shows that the first master steering amplifier 164 is connected by means of the lead 169 to the forward and reverse switch 170 and thence by means of the lead 172 to the program box 174 which in turn is connected by the lead or servo-valve harness 176 to a terminal block 177 of the servo-manifold 70. The modified and amplified signal carried in the lead 176 controls the individual servo-valves S-1 (front slave steering) and S-2 (rear slave steering) in the servo-manifold 70. The servo-valve S-1 controls the steering ram 50 through the dual hydraulic lead 64 and servo-valve S-2 controls the ram 60 through the dual hydraulic lead 66. Similarly the servo-valve S-3 controls the steering ram 100 through the dual hydraulic lead 180 while the servo-valve S-4 controls the steering ram 108 through the dual hydraulic lead 182. The source of hydraulic oil and pumps therefor is illustrated at 183.

For convenience the main amplifier 162 is mounted within the control console 184 carried on the top side of the frame and conveniently located so that one man can control the operation of the machine. The console 184 is set up to allow both automatic and manual control by the operator and since these functions are well known in this art, further description is unnecessary.

Further in reference to FIG. 1 a drive sprocket 186 is carried centrally of the front steering axis 32 of tractor 40. The drive sprocket 186 is directly connected and rotates with the rotation of tractor 40. This end of the walking beam 30 carries the front master steering detector 188 having a driven sprocket 190 at one end of its housing. The drive chain 200 connects between the drive sprocket 186 and the driven sprocket 190 of the master steering detector 188. Thus, the sprocket 186 and the sprocket 190 rotate in synchronism with the tractor 40.

A similar arrangement is disclosed for the opposite end of the walking beam 30 wherein the steering axis 34 has affixed thereto the drive sprocket 202 which is connected by means of the drive chain 204 to the driven sprocket 206 of the first rear steering detector 208, the latter being affixed to and carried by this end of the walking beam.

On the inboard side of the machine the front steering axis 94 carries the drive sprocket 210 connected by the drive chain 212 to the driven sprocket 214 of the second front steering detector 216. At the rear end of the walking beam 72 the drive sprocket 218 is carried by the steering axis 96 and is connected by means of the drive chain 220 to the driven sprocket 222 of the second rear steering detector 224.

The front master steering detector 188 includes the front master feedback potentiometer 226 which is connected by means of a spur gear to the front slave sensor potentiometer 228 and in turn is connected by means of a spur gear to the wall potentiometer 230. The rear steering detector 208 includes the rear master feedback potentiometer 231 and the rear slave sensor potentiometer 232. These are also interconnected by means of spur gears. The other front steering detector 216 includes the front slave feedback potentiometer 234 and the wall potentiometer 236. The rear steering detector 224 has but a single rear slave feedback potentiometer 238. These parts are rotatable and the spur gear connections for all four steering detectors will be described in relation to the FIGS. 2 and 3 and in more detail in FIGS. 4 to 9.

The electrical connection 239, for the front steering detector 216, leads to the feedback junction box 240 carried by the walking beam 72 while the electrical connection 241 for the rear steering detector 224 is also connected to this junction box. The electrical connections between the junction box 138, the dual slave amplifier 168 and the junction box 240 are not shown for simplicity.

Briefly, the operation of the component parts thus far described is as follows: Assuming that the machine is progressing in the direction of the arrow 82 along the stringline with the front steering sensor arm or wand 132 and the rear steering sensor arm or wand 152 in sliding contact with the stringline, each steering sensor will detect a variation in the direction of the machine in relation to the stringline.

The remote steering sensors 130 and 150 each has a rotatable, spring-loaded hub from which its sensing arm is attached so that when the arm moves, the hub rotates. This causes the shaft and rotor of a microsyn sensor therein to rotate within a stator. It is in effect a variable rotary transformer and rotation produces a change in the electrical output signal from each sensor to the amplifier group 162.

When the sensor arm 132 is in the null position, it is centered and there is zero output voltage. Also, the readout meter in the front master steering amplifier 164 is centered. Thus, as the steering sensor 130, the first to detect a change in direction, receives a rotational signal from the stringline, there is produced an output voltage signal dependent in magnitude and polarity upon the movement of the sensor arm 132 to either side of the null point, and the amount of such movement. This output voltage signal is sent via the electrical leads 134 and 140 to the front master steering amplifier 164. That signal is transformed into an error signal which is sent via the control line 176 to the servo-valve S-1. The servo-valve S-1 operates in response to the signal and causes the extension or retraction of the hydraulic ram 50 through the hydraulic line 64. This causes the front tractor 40 to begin to rotate correspondingly.

The polarity of the signal (plus or minus) from the sensor 130 depends on the direction of the rotation due to the contact with the stringline. The amount of voltage depends on the distance the arm 132 is moved from the null point.

This generated voltage is received by the panel amplifier group 162 and compared against the internally generated set point (command) voltage, which always requires the arm 132 to be in the null position. These two voltages (the one from the remote sensor and the internal set point voltage) are compared by the amplifier and an amplified error signal is sent to the servo-valve. At the same time, a meter on the panel visible to the operator is deflected in the direction and to the magnitude of the error signal. The amplified error signal voltage is applied to the torque motor of the servo-valve S-1. As is known in this art, the torque motor is connected to the spool piece of this four-way valve. The polarity of the amplified voltage will determine the direction of valve spool movement and the direction of flow of hydraulic fluid in the dual line 64 controlling the ram 50.

In order to add stability to the steering system thus far described, it is also necessary to provide a means of steering position feedback. The reason for this is that, with the machine stopped, it is not possible to correct for a steering error.

In the grade and slope systems, a sensed error results in a corrective cylinder motion; the machine frame 12 moves; the grade sensor 116 comes back to the null; and the cylinder stops moving. In the steering system, however, a sensed error results in a correctional cylinder motion, and the track 40 turns. If the machine 10 is stopped, the frame 12 doesn't get closer to the stringline (or farther away, as the case may be), and the error signal persists, with the result that the track 40 keeps pivoting about the axis 32 until it reaches full travel of the ram 50.

When on a curve, an error signal — when comparing arm position to straight ahead steering — is always present. If the machine is stopped on a curve, even if the relationship with the stringline is perfectly normal, the track 40, without feedback, will pivot to full travel.

When the machine is started in motion again, the angle of approach to the stringline will be very sharp with the tracks cramped all the way over. Because of this, by the time the normal distance from the stringline is reached, the tracks can't be pivoted back to their proper angle quickly enough to prevent the sensor 130 from being driven through null, and a steering error in the opposite direction is developed. This oscillation from full steer left to full steer right is likely to continue indefinitely unless manual steering corrections are used to straighten out the machine, a process which could require stopping and re-starting. The effect of violent steering swings on the alignment of concrete pavement, curbing or wall being formed is of course totally undesirable.

In accordance with this invention, as the tractor 40 is turned in response to the movement of the ram 50, the front master feedback potentiometer 226 is also rotated through the sprocket 186, the chain drive 200, the driven sprocket 190 and a gear arrangement so that the null point of the sensor 130 is changed. This stops the signal from the sensor by the same amount or degree as the correction. Thus, the front master feedback potentiometer 226 and the sensor 130 work together incrementally to control the cylinder 50. The front slave sensor potentiometer 228 is rotated simultaneously by the same amount and it is connected through the system and servo-valve S-3, operating the ram 100 thereby rotating the front slave feedback potentiometer 234. The feedback potentiometer 234 thus sends a feedback signal to the slave amplifier 168 searching for the null point, established by the front master feedback potentiometer 226 within the first master steering amplifier 164. The steering ram 100 is thus moved the same amount and direction so that the track 90 turns exactly with the track 40 because both feedback potentiometers follow the same change in null point.

Since the simultaneous steering of tractors 40 and 90 in the direction called for by the stringline will change the relationship of the rear steering sensor arm 152, with the stringline, the sensor 150 sends an output signal to the amplifier group 162 via the electrical leads 154 and 160 to the rear master amplifier 166. The rear master feedback potentiometer 231 operates to change the null point of the sensor 150 and the ram 60 and ram 108 are operated to maintain the rear of the machine a selected distance from the stringline.

Figure 2:
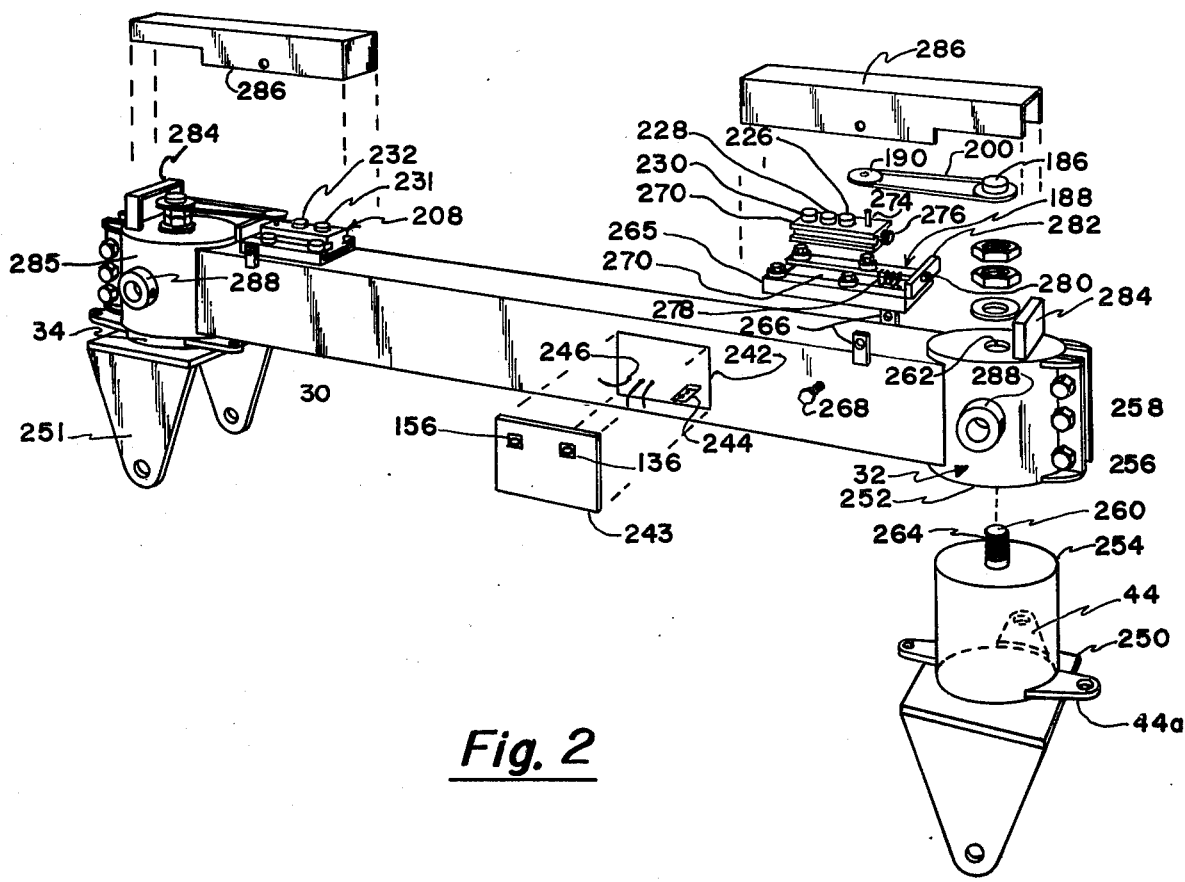
FIG. 2 is a partially exploded view of one form of walking beam as in FIG. 1 on the string line or steering sensor side of the machine.

Similarly, as the rear steering sensor 150 comes to the direction change for which a change in steering direction has already been made by the front sensor 130, the signal so generated is sent via leads 154 and 160 to the rear master amplifier 166 which functions like amplifier 164. At the same time the rear master feedback potentiometer 231 produces a comparative signal for the amplifier group 162 and the rear master amplifier 166, to form a suitable signal to operate the servo-valve S-4 and turn the ram 108 with and in the same direction as the ram 60. Thus the tractors 42 and 92 turn together to the same amount and direction. Referring to FIG. 2 the general organization of these parts as carried by the walking beam 30 is illustrated. The walking beam 30 has a tubular construction with a side opening 242 upon which the cover member 243 is attached by means of bolts. This arrangement is on the outside of the walking beam 30 to provide access to the terminal strips 244 and the lead wires 246. The cover plate 243 includes one or more plugs such as the plugs 136 and 156 (also shown in FIG. 2) for the steering sensors 130 and 150. The lead wire assembly 246 would include the various lead connections such as the necessary connections between the front steering detector 188 and the rear steering detector 208.

FIG. 2 illustrates one form of saddle mount or bogey 250 for the front tractor 40. The steering axis 32 is generally represented by the housing 252 which has an opening to receive the upstanding cylindrical shaft 254 affixed to the top of the bogey-mount 250. The assembly of the bogey 250 within the housing 252 in a rotationable relationship is facilitated by the provision of a slot 256 in the housing which is adjustably closed by means of the bolts 258 which tangentially span the opening of the slot through suitable gussets. The stub shaft 260 protrudes centrally from the top of the large shaft 254 and extends through the bore hole 262 above the top surface of the cylindrical housing 252. The end 264 of the stub shaft 260 is threaded so as to provide means for the rigid attachment of the drive sprocket 186.

More of the details of the structure of the front master steering detector 188 are shown in FIG. 2. This detector includes the elongated guide base 265 that is firmly attached, as by welding, to the top of the walking beam 30. One or more pairs of cleats 266 hold the cover member 286 over the assembly by means of the attaching bolt 268. The base 264 is positioned in a position on the walking beam to accommodate the drive chain 200. The guide base 265 has an open-ended, flat, enlarged slot 270. The potentiometer casing 272 is adapted to slide longitudinally over this slot 270 in a manner to be described. The potentiometer housing 272 includes the potentiometers 226, 228 and 230 and holds the stub shaft 274 at one end to receive the driven sprocket 190. The drive chain 200 connects between the drive sprocket 186 and the driven sprocket 190.

The inner end of the potentiometer housing 272 has the externally protruding stub shaft 276 to serve as a base for the biasing spring 278 by means of the seat bolt 280 that extends through the raised end wall 282. In assembled condition upon the walking beam 30 these parts are delicate and somewhat exposed, therefore, a front cover plate 284 is provided to match with the top cover member 286 in the assembled condition.

The general assembly of the rear steering detector 208 is shown at the other end of the walking beam 30 in FIG. 2. The organization of these parts is the same except that this rear detector has only two potentiometers 231 and 232. The rear plate 284 is affixed to the rear housing 285 and becomes an end wall when its cover 286 is attached. Also, the bottom edges of these covers are shaped so that they fit upon the flat surface of the walking beam and extend over the respective housings 252 and 285. The front and rear housings 252 and 285 include the transverse pivot axes 288 which, as previously described, are for the purpose of pivotally mounting either end of the walking beam 30 to its respective vertically adjustable support.

Figure 3:
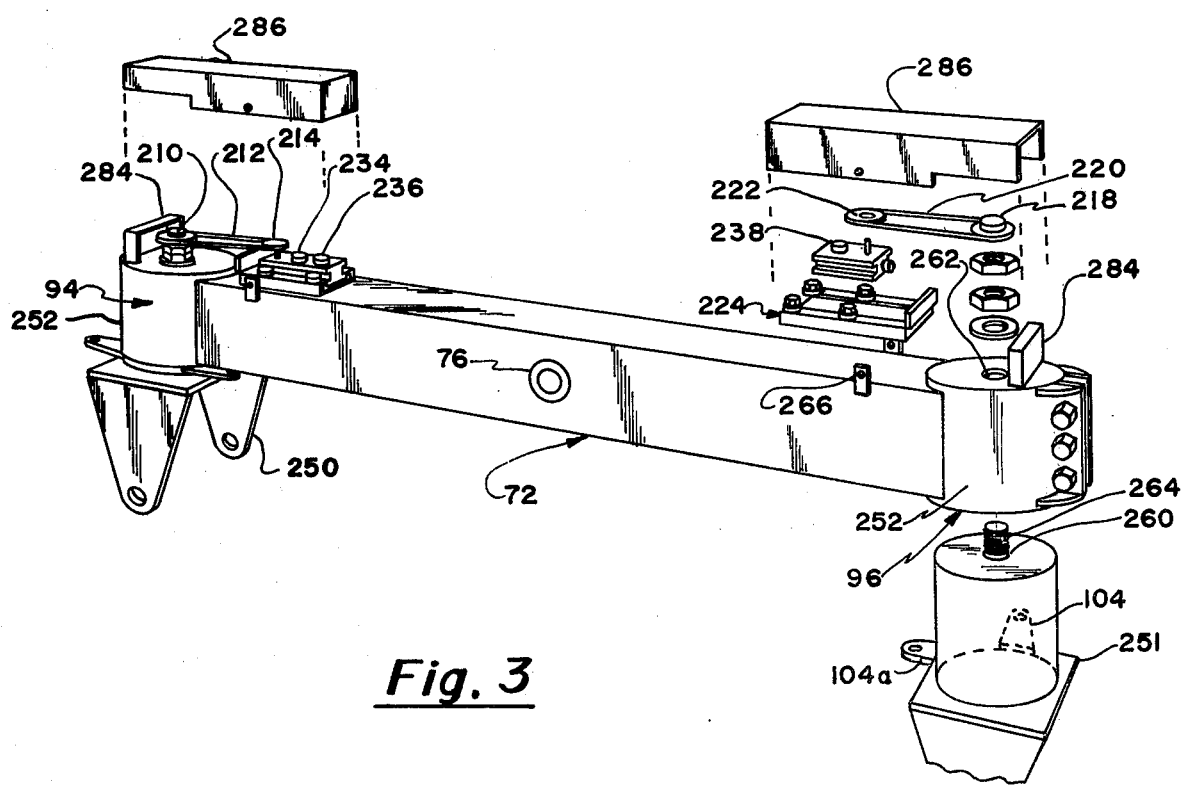
FIG. 3 is a partially exploded view of another form of walking beam as in FIG. 1 on the opposite side of the machine.

Those parts of the inboard assembly of the walking beam 72 which are identical with the parts shown in FIG. 2 will bear corresponding numbers in FIG. 3 showing the details for the other or outboard side of the machine. Here the front bogey 250 for the front tractor 90 is shown in assembled condition within the front steering housing 252. This combination of elements forms the front steering axis 94 for this side of the machine. The drive sprocket 210 mounted at the top of the housing 252 rotates directly with the bogey-mount 250 and is connected by means of the chain drive 212 to the driven sprocket 214 of the steering detector 216.

The rear bogey-mount 251 is shown disassembled from the housing 252 forming the rear steering axis 96 on this side of the machine. The shaft 260 at the center top of the bogey-mount 251 extends through the hole 262 in the top of the housing 252 and engages the drive sprocket 218 carried thereby. The only difference between the steering detectors 188, 208, 216 and 224 is the number of rotatable potentiometers included in their respective bases. Except for the number of parts employed, a detailed description of the steering detector 188 will suffice for the other steering detectors.

Referring to FIG. 4 a perspective view of the steering detector 188 is shown. The drive sprocket 186 connects to the driven sprocket 190 by means of the drive chain 200. The driven sprocket 190 and the three potentiometers 226, 228 and 230 are arranged in an in-line and equally spaced relationship within the slideable housing 272 which may be made of a single block of steel or aluminum alloy. The base 265, which may be similarly formed, includes the open-ended wide flat-bottomed slot 270 with the bolts 302 forming opposing and longitudinally spaced axes along the edge of the spaced top surfaces 304 of the base 265. Each bolt 302 supports a precision ball bearing 306 through its inner race in such a manner that the flat surfaces 308 of their outer races extend over the top edge of the slot 270 by equal amounts. In this symmetrical position the bearings 306 can engage the longitudinal open-ended side slots 310 in the planar parallel opposite sides 312 of the housing 272.

By these means the housing 272 is mounted upon the base 265 so that it is free to move in a practically frictionless, longitudinal path in the direction of the double arrow 314 and can be readily inserted upon or removed from this position by hand. The base 265 includes an end wall 282, welded thereto at 318 at one end adjacent and spaced from the drive sprocket 186. The top surface 320 of the reciprocatable housing 272 is above the coplanar top surfaces 304 so that the drive chain 200, on being placed up on the sprockets 186 and 190, clears the top edge 322 and is free to perform its precise sensing or slave function.

The inner end 324 of the housing 272 has a stub shaft 276 (refer to FIGS. 2 and 5) which supports and centers one end of the coil spring 326 while the other end is pressed against a retaining washer (to be described) carried by the adjusting bolt 280 having its hex end on the outside of the end wall 282. The spring 326 urges the housing 272 away from the end wall 282, and places the drive chain 200 under sufficient tension to remove all slack from the chain. The end wall 324 of the housing 272 is spaced from the inner surface of the end wall 282 at all times.

Each of the potentiometers 226, 228 and 230 is identical and includes a base plate 330 for attachment to respective equally spaced bore holes in the housing 272 so that their spindles (to be described) are exactly centered and their axes are equal distances from each other. The small bolts 332 engage against the tops of the base plates 330 and their threaded ends engage suitable threaded bore holes in the top surface 320 to hold the potentiometers in exact positions. By loosening the pairs of bolts 332 for each potentiometer, it can be rotated by hand to change the phase thereof and tune the steering detector 188, as will be described.

Lead wires (not shown in FIG. 4) are connected from the three terminals 340 of each potentiometer to the terminal plate 342 that is conveniently affixed to one side of the base plate 265. During testing and synchronization of the steering detectors it is necessary to connect a portable battery-powered test meter to these terminals, and for this reason they are exposed on the top of the base 265 for easy access.

FIG. 5 is an exploded view of the detector 188, which technically would be described as the front master multi-sense and feedback sender, wherein the corresponding parts from FIG. 4 bear the same numerals. The end wall 282 of the base 265 has the bore hole 350 which receives the shank 352 of the adjusting bolt 280 in rotational relationship and the threaded end 354 engages the nut 356 in threaded relationship. The flat washer 358 encompasses the threaded end 354 and fits flush between the nut 356 and the one end of the compression spring 326.

Each of the axle bolts 302 has a threaded shank 360 that fits into and engages a bottom threaded portion in its respective bore hole 362 in the top surface 304 of the base 265. The precision instrument bearings 306 have a central bore 364 in their inner races that precisely engage the unthreaded portion of the shank 360 and are held in spaced relationship from the surface 304 by a suitable flat washer 366. Each of the bearings 306 is similarly mounted so that its outer race 308 protrudes over the edge 368 of the flat open-ended groove 270. The outer edges 370 of the groove or recess 270 are undercut. The color-coded lead wires A-H connect the three potentiometer terminals 340 of each potentiometer 226, 228 and 230 to the exposed double-ended terminals of the junction or electrical connection strip 342, same being insulated from the base 265.

The housing block 272 has the boss or protuberance 276 at the center of the inner end 324 which is received within the other end of the compression spring 326. When the housing 272 is slid into place with the outer grooves 310 on the side edges 312 engaged upon the outer races 308 of the four precision bearings 306, the clearance or amount of play between these rotating and sliding parts is within a few thousandths of an inch so that the housing 272 is freely reciprocatable back and forth. But, once in position with the chain 200 engaging the drive sprocket 186 and the driven sprocket 190, the bias of the spring 326 holds the housing 272 quite rigidly, yet takes up any play in the drive sprockets and chain during rotation.

The supporting driven shaft 274 is carried by suitable precision bearings such as the pair of bearings 376 and 376c for the potentiometer 230 within the enlarged bore 378 in the housing block 272. The shaft 274 carries the first driven spur gear 380 at the lower end which engages the series of interconnected and identical spur gears 380a, 380b and 380c on their respective shafts 382a, 382b and 382c. *The top precision bearings 376 for the potentiometers 226 and 228 are within their respective enlarged bores, like the bore 378, while the bottom precision bearings 376a, 376b and 376c for the potentiometers* 226, 228 and 230 are exposed in the exploded view for simplicity.

Each of the potentiometers is design to transmit a signal which is proportional to the degree of rotation of a moving contact on the inside of its casing on each side of a null point. Each potentiometer has a lower depending spindle 390 connected at its upper end to the contact which is engaged by a series of O-rings 392 in assembled condition within the bore holes 393 of the shafts 382 which support the respective inner races of both the top and bottom pairs of bearings 376 for each spindle. An external snap ring 394 (only one shown) holds the assembly of lower bearings 376a, etc., the spur gears 380a, etc., and the shafts 382 together in a fairly tight slip-fit relationship, as will be described in relation to FIG. 8.

The sprockets 186 and 190, as well as the gears 380, 380a, 380b and 380c are of the same effective diameter so that a direct 1:1 rotational relationship is produced. Thus, the angular change experienced by the vertical shaft 260 (FIG. 2) on the bogey-mount 250 for the front tractor 40 is the same as the angular displacements of the sprockets 186 and 190, as well as each of the spur gears, with a very close tolerance and with essentially zero backlash.

The O-rings 392 are a friction drive and allow each potentiometer to be properly zeroed by loosening the bolts 332 and turning the entire potentiometer one way or the other following which the bolts 332 are again tightened.

Figure 6:
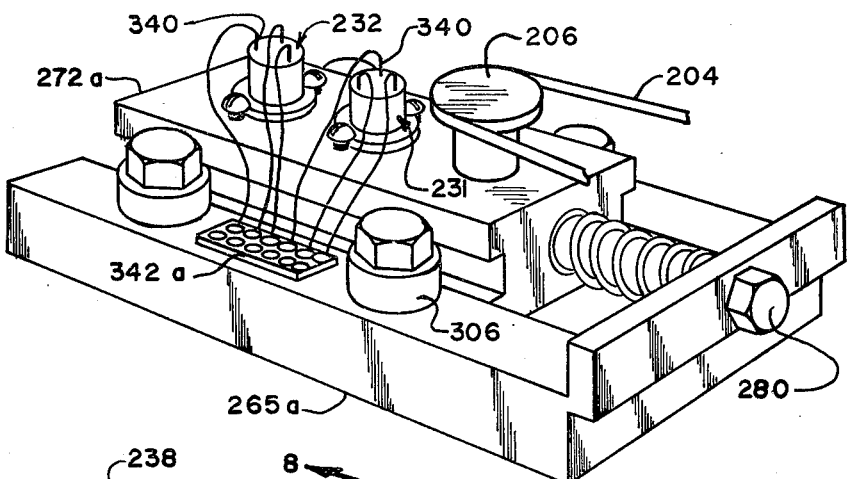
FIGS. 6 and 7 are perspective views of the dual and single potentiometer assemblies that are used.

FIG. 6 shows the general external organization of the same parts for the steering detectors 208 and 216 which are identical in construction but connected into the circuit differently. Since these steering detectors have but a pair of potentiometers (231 and 232 for detector 208, as illustrated in FIG. 6, and 234 and 236 for detector 216, as illustrated in FIG. 1) the base 265a can be shorter as well as the sliding housing 272a. The remaining parts are identical and bear the same reference numbers as used in FIG. 4.

Figure 7:
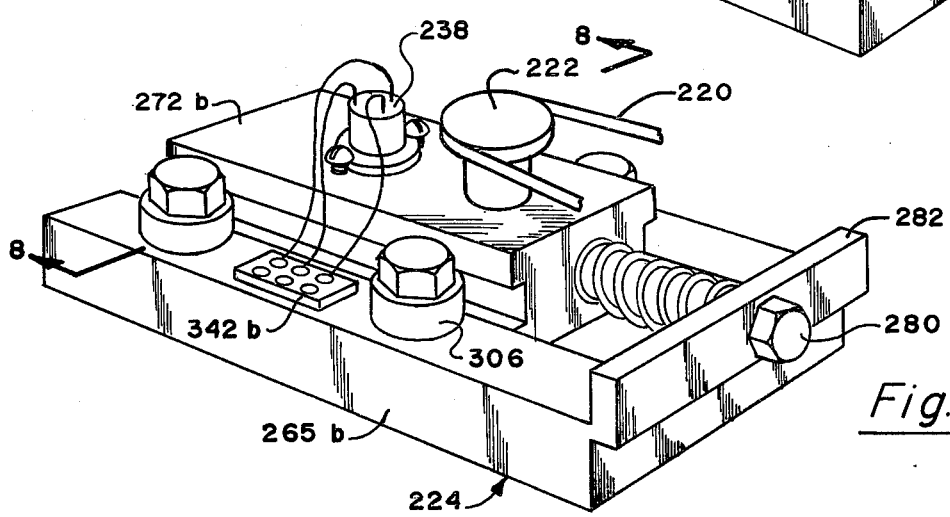

The same may be said for FIG. 7 wherein the steering detector 224 is shown in assembled condition. The respective terminal connectors 342a (See FIG. 6) and 342b are the same except that fewer points of connection are necessary.

Figure 8:
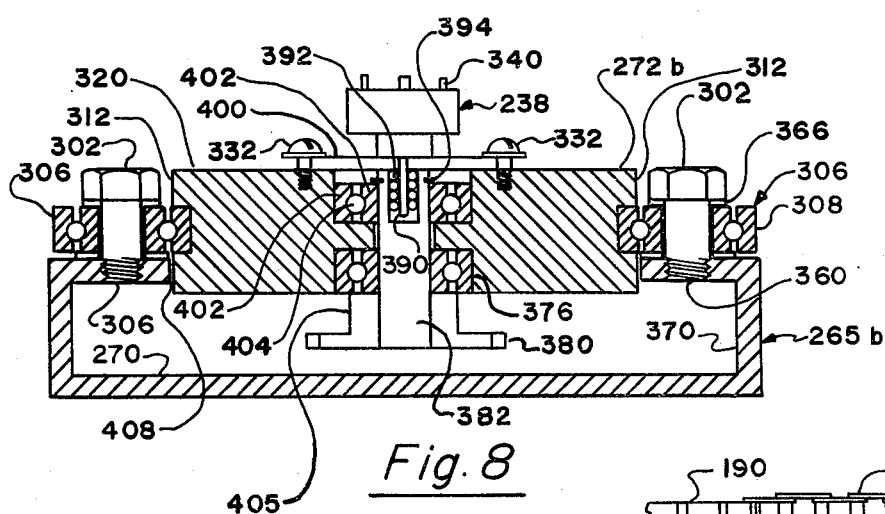
FIG. 8 is a cross-sectional view taken along the lines 8—8 of FIG. 7 to show the potentiometer mounting.

FIG. 8 illustrates the slip-fit double bearing arrangement for each rotatable potentiometer of the various detectors, using the potentiometer 238 of the detector 224 of FIG. 7 as an example.

The circular base 400 of the potentiometer 238 is held to the top surface 320 of the housing 272b by means of the bolts 332. The spindle 390 extends through the O-rings 392 centered within the center hole 393 of the shaft 382, held by the inner race 402 of the topmost of the bearings 376, the ball bearings of which are illustrated at 404. The external snap ring 394 holds the shaft 382 upwardly within the bearings. For this purpose the end of the shaft 382 has a groove 405, shown in FIG. 5. The spur gear 380 and the shaft 382 are carried by the lower bearing 376 in a known manner to provide practically friction-free rotation of the spur gear to turn the spindle in synchronism. The hub 405 of the spur gear 380 is held against the bottom of the inner race 404 of the lower bearing.

FIG. 8 also shows how the bolts 302 and the washer 366 hold the pair of precision roller bearings 306 on each side of the wide groove 270 with their outer races 308 in free rolling contact with the side grooves in the housing 272b. A slight clearance at 408 on each side between the outer walls 312 of the housing 272b and the top edges 368 (See FIG. 5) of the groove 270 and cut-out 370 is provided by this assembly so that the housing 272b is carried entirely by the bearings 306.

Figure 9:
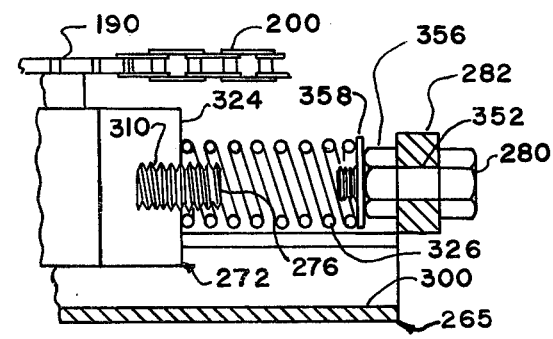
FIG. 9 is a cross-sectional view taken along the lines 9—9 of FIG. 4 to show the spring-loading structure for the chain-drive and parts of the gearing.

FIG. 9 is a cross-section at lines 9—9 of FIG. 4 to show the structure of the parts relating to the resilient bias spring 326 and the bolt 280 carried by the end wall 282 to maintain tension on the drive chain 200. The spring 326 seats around the protuberance 276 at one end and seats against the washer 358 at the other end. It is apparent that by increasing or decreasing the number of washers 358, proper adjustments can be made to keep the drive chain 200 taut and under constant spring pressure forcing the housing 272 and the driven sprocket 190 in a direction away from the drive sprocket 186.

The machine 10 can be operated in a direction the reverse of arrow 82 in FIG. 1 if desired. This is readily accomplished by reversing the switch 170 and engaging the drive motor for the tractors in reverse.

The steering rams 50, 100, 60 and 108 have quickdisconnect pivot or clevis pins at the ends of their respective points of attachment to the saddles and walking beams so that the track members can be oriented 90° from their positions in FIG. 1 to the so-called "wall" position as opposed to the paving position shown. The adjustable frame support members allow the operator to raise the frame, insert supporting blocks thereunder and then lower the frame until it rests on the blocks and the tractors are raised from the ground. The tractors are then turned 90° and the steering rams reconnected for the pair of tracks on either side now turned in the new direction of travel. The opposite tractors are tied thereto by steering linkages (not shown) so that power steering of one tractor causes the other to follow mechanically. The "wall" position allows the machine to assume its narrowest configuration of FIG. 1 for transportation and placement on a trailer. Also, in the wall mode side-mounted tools can be used, in which event the sensor bracket assemblies 114 are removed and re-attached along the selected tool side.

To illustrate, the steering rams 50 and 100 can be re-connected to the appropriate other steering arm, such as arm 44a in FIG. 2 and 104a in FIG. 3 for coordinated steering in the direction of arrow 82a. The steering linkages are attached to the steering assembly with one between the now left front track saddle 250 and the now right front track saddle 251, and one between the now left rear track saddle 250 and the now right rear track saddle 251.

Shunting plugs, known in the art, in the amplifier group 162, are rearranged so that the wall potentiometers 230 and 236 of detectors 188 and 216 are activated. In this mode the sensor 130 sends a signal to the amplifier 164 and produces an error signal sent through the leads 169 and 176 to the terminal block 177 to change the position of the servo-valve S-1 and move the steering ram 50, turning the track 40. The track 42 follows by means of the mechanical steering linkage, like the front wheels of an automobile. Rams 60 and 108 are disconnected and placed in a suitable carrying bracket on the walking beams.

Turning tractor 40 rotates the wall potentiometer 230 producing a null which stops the track 42 from oversteering. In the rear of the machine this same function is taken over by the wall potentiometer 236 and the track 90 controls the track 92 through a steering linkage. The potentiometers 226, 228 and 234 are deactivated, since they have been turned 90° by their chain drives and are out of phase.

The positions of the steering sensors 130 and 150 are rearranged so that the side of the frame along the beam 14 becomes the inboard side following a grade line and a side-mounting tool is attached from this side of the frame. Accordingly, the tractors 40 and 90 follow the grade line and the tractors 42 and 92 are mechanically linked by the steering linkages to follow in the same path as they come to the same correction in the stringline.

A number of modifications can be made in the arrangements of the steering controls and other parts of the machine 10, without departing from the invention. The steering detectors 188, 208, 216 and 224 need not have the axes of their respective potentiometers arranged in a straight line or in vertical-spaced relationship. The arrangement shown is inexpensive to manufacture, rugged and the simplest to maintain. The gears 350a, etc., can also be arranged in a cluster about the driven gear 380. Also, the potentiometers of each steering detector can be supported on a common axis in tandem with each spindle or pin 390 held thereto by the slip-fit O-rings 392. A rack and pinion arrangement can also be used to drive each of the potentiometers simultaneously and attain equivalent results.

Since the sensors, tractors, drive motors, potentiometers, terminals, solenoid valves and amplifiers are commercially available components there is no need to describe them in more detail.

A number of advantages of the machine of this invention become apparent from his description. The absence of any tie rods for steering the machine in the paving mode (FIG. 1) allows full use of the grade control potential of the vertically adjustable supports at the steering axes 32 and 34 and the slope control potential of the adjustable support 74. Another advantage is that the telescoping frame of the machine allows it to be used in the paving mode to lay a gradually diverging lane of pavement such as is necessary at the beginning and end of the cut-off or approach lanes of super-highways. Also, emergency parking lanes can be laid using this feature.

To accomplish this the sensor system on the walking beam 30 would be duplicated on the walking beam 72 using the existing steering detectors. The tractors 90 and 92 could then follow the edge of an existing outside lane of pavement of the main highway or a second stringline. The right side of the machine would follow its stringline which very gradually diverges from the reference on the other side of the machine and the U-shaped frame member 24 would gradually move outwardly. To facilitate the expansion and contraction of the frame 12 through the use of the telescoping frame member 24, suitable roller contacts (not shown) such as those disclosed in said copending application would be included between these heavy frame parts.

The auger, tamper and screed tools carried by the frame would also have to telescope, travel transversely or otherwise change in length as the machine progresses.

What is claimed is:

1. A construction machine comprising:
a main frame;
ground engagement means disposed from said main frame to support and transport said machine along a path of travel;

a pair of said ground engagement means being disposed at opposite front corners of said main frame and rotatably connected thereto on individual steering axles;

power means to individually turn each of said front ground engagement means about its respective steering axle;

a steering sensor associated with one of said front ground engagement means and adapted to produce a steering voltage on either side of a null point indicating the magnitude and direction of a change in the path of travel of said machine from a reference extending along the path of travel;

steering detector means associated with each of said front ground engagement means including a rotatable member adapted to turn with the respective steering axles of each of said ground engagement means;

said steering detector means for said one front ground engagement means having a first feedback potentiometric means operably connected to its rotatable member for rotation in synchronism therewith to produce a first feedback signal and a second potentiometric means to produce a slave signal;

said steering detector means for said other front ground engagement means having a second feedback potentiometric means operably connected to its rotatable member for rotation in synchronism therewith to produce a second feedback signal;

and electrical means to receive said voltage signal from said steering sensor and produce an amplified power signal to control said power means to turn said one ground engagement means about its steering axle and to receive said slave signal and produce a second amplified power signal to control said power means to turn said other ground engagement means about its steering axle;

said electrical means being further adapted to receive said first and second feedback signals to change the null point of said steering sensor by the same amount and degree of steering correction and thereby incrementally control both of said power means following said null point of said steering sensor and thereby turn said pair of ground engagement means in synchronism about their respective steering axles.

2. A construction machine in accordance with claim 1 including:

a second pair of ground engagement means disposed on individual steering axles from the rear corners of said main frame to support and transport said machine along said path of travel;

power means to individually turn each of said rear ground engagement means about its respective steering axle;

a second steering sensor associated with the one of said rear ground engagement means on the same side of said main frame as the steering sensor for said one front ground engagement means and adapted to produce a steering voltage on either side of a null point indicating the magnitude and direction of a change in the path of travel of said machine from said reference;

steering detector means associated with each of said rear ground engagement means including a rotatable member adapted to turn with the respective steering axles of said rear ground engagement means;

said steering detector means for said one rear ground engagement means having rear feedback potentiometric means operably connected to its rotatable member for rotation in synchronism therewith to produce a first feedback signal and a second potentiometric means to produce a slave signal;

said steering detector means for said other rear ground engagement means having second feedback potentiometric means operably connected to its rotatable member for rotation in synchronism therewith to produce a second feedback signal;

and electrical means to receive said voltage signal from said rear steering sensor and produce an amplified power signal to control said power means to turn said one rear ground engagement means about its steering axle and to receive said slave signal and produce a second amplified power signal to control said power means and turn the other rear ground engagement means about its steering axle;

said electrical means being further adapted to receive said first and second feedback signals to change the null point of said second steering sensor by the same amount and degree of steering correction and thereby incrementally control both of said power means following said null point of said second steering sensor and thereby turn said rear pair of ground engagement means in synchronism about their respective steering axles.

3. A construction machine in accordance with claim 1 in which:

said electrical means includes a first master steering amplifier receiving said voltage signal from said steering sensor to produce said amplified power signal and a front slave amplifier to receive said slave signal and produce said second amplified power signal; and means to compare said first feedback signal with an internally generated set point voltage requiring said steering voltage to be at said null point whereby said pair of ground engagement means are turned in synchronism about their respective steering axles.

4. A construction machine in accordance with claim 1 in which each of said steering detector means include:

an elongated base member;

a plurality of roller means supported in substantially the same plane from one side of said base member;

said roller means having their axes substantially equally spaced longitudinally along and on each side of the longitudinal axis of said base member and presenting coplanar, opposed, spaced roller surfaces;

a housing member having spaced opposite parallel side walls defining open-ended elongated grooves therealong;

the grooves of said housing member being engageable with the roller surfaces of said roller means;

a series of rotatable shaft members supported by said housing member;

said housing member providing support at one end between said side walls for said rotatable member operably connected to the respective steering axis of the associated ground engagement means;

axle means rotatably mounting said potentiometric means on equally spaced axes adjacent said rotatable member; and equal diameter gear means operably connected between said axle means and said rotatable means whereby to impart synchronism to said rotations.

5. A construction machine in accordance with claim 4 in which:
the axle means rotatably mounting said potentiometric means include resilient friction drive means connecting to said gear means.

6. A construction machine in accordance with claim 5 in which:
each of said potentiometric means includes a rotatable spindle;
said axle means includes a central bore; and said resilient friction drive means comprises a series of "O" rings encompassing said spindle and contained within said bore.

7. A construction machine in accordance with claim 5 including:
means affixing said axle means to housing means in selected rotatable positions whereby said potentiometric means are adapted to be released and rotated to the same phase positions or to out of phase positions.

8. A construction machine in accordance with claim 1 in which:
said steering detector means have their rotatable members connected to said steering axles by a chain drive means;
said steering detector means each having an elongated fixed base member;
a housing member supported by said base member for free longitudinal guided straight line reciprocation therewith;
said housing members having axle means supporting said potentiometric means and said rotatable member;
gear means interconnecting said rotatable member with said axle means to impart rotation one to the other; and
spring means biasing said housing member and rotatable member in relation to said base member whereby to tauten said chain drive.

9. A construction machine comprising:
a main frame;
ground engagement means disposed from said main frame to support and transport said machine;
a pair of said ground engagement means being disposed at opposite corners of said main frame along a front side thereof;
each of said front ground engagement means being connected to said main frame on a vertical steering axle;
power means to individually turn each of said front ground engagement means about its respective steering axle;
one of said front ground engagement means having a steering sensor associated therewith with a sensor arm disposed for engagement with a steering reference extending along an adjacent side of said main frame to produce a steering signal on either side of a null point thereby indicating the direction and magnitude of a change in direction of said steering reference;
a steering detector supported by said main frame and associated with each said front ground engagement means;
each of said steering detectors including a rotatably member operably connected to the respective steering axle of its associated ground engagement means to rotate in synchronism therewith;
said steering detector for said one front ground engagement means having a master feedback potentiometer and a slave sensor potentiometer each rotated in synchronism with said rotatable member of its steering detector;
said steering detector for the other front ground engagement means having a slave feedback potentiometer rotated in synchronism with said rotatable member of its steering detector; and
electrical means to receive said steering signal from said steering sensor and produce an amplified signal controlling said power means to turn said one ground engagement means about its steering axle and simultaneously turn said master feedback potentiometer through said steering detector whereby to compare said steering signal with an internally generated set point and nullify said steering signal and simultaneously rotate said slave sensor potentiometer an equal amount in the same direction to produce a second signal;
said electrical means amplifying said second signal and simultaneously sending a power signal to control said power steering means of said other ground engagement means thereby rotating its associated slave feedback potentiometer whereby to send a feedback signal for comparison with said internally generated set point and nullify said second signal and turn said other ground engagement means in synchronism with said first ground engagement means.

10. A construction machine in accordance with claim 9 in which:
a second pair of ground engagement means adapted to transport said machine is provided and disposed on steering axles at opposite corners of said main frame along a rear side thereof and further including:
power means to individually turn each of said rear ground engagement means on said steering axles independent of said front pair of ground engagement means;
that one of said rear ground engagement means following said one front ground engagement means having a second steering sensor associated therewith with a second sensor arm disposed for engagement with said steering reference to produce a second steering signal on either side of a null point indicating the direction and magnitude of a change in direction of said steering reference;
a steering detector supported by said main frame and associated with each of said rear ground engagement means;
each of said steering detectors including a rotatable member operably connected to the respective steering axle of its associated ground engagement means to rotate in synchronism therewith;
said steering detector for said one rear ground engagement means having a master feedback potentiometer and a slave sensor potentiometer each rotatable in synchronism with said rotatable member of its respective steering detector;
said steering detector for the other rear ground engagement means having a slave feedback potentiometer rotated in synchronism with said rotatable member of its respective steering detector; and second electrical means to receive said second steering signal from said second steering sensor and produce an amplified signal controlling said power means to turn said one rear ground engagement means about its steering axle and simultaneously turn said master feedback potentiometer through said second steering sensor whereby to compare said steering signal with an internally generated set point and nullify said second steering signal and simultaneously rotate said slave sensor potentiometer an equal amount in the same direction to produce a second signal;

said electrical means simultaneously sending a power signal to control said power steering means of said other rear ground engagement means thereby rotating its associated slave feedback potentiometer whereby to send a second feedback signal for comparison with said internally generated set point and nullify said second signal and turn said other rear ground engagement means in synchronism with said one rear ground engagement means.

* * * * *